United States Patent
Taira

(10) Patent No.: US 8,945,462 B2
(45) Date of Patent: Feb. 3, 2015

(54) METHODS FOR MANUFACTURING A CALCINED GYPSUM AND A GYPSUM BOARD

(75) Inventor: Shizuo Taira, Tokyo (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 0 days.

(21) Appl. No.: 12/306,793

(22) PCT Filed: Apr. 16, 2007

(86) PCT No.: PCT/JP2007/058276
§ 371 (c)(1),
(2), (4) Date: Dec. 29, 2008

(87) PCT Pub. No.: WO2008/001538
PCT Pub. Date: Jan. 3, 2008

(65) Prior Publication Data
US 2009/0256291 A1 Oct. 15, 2009

(30) Foreign Application Priority Data
Jun. 29, 2006 (JP) ................................. 2006-179984

(51) Int. Cl.
*C04B 11/26* (2006.01)
*C04B 11/024* (2006.01)
*C04B 28/14* (2006.01)
*C04B 111/00* (2006.01)

(52) U.S. Cl.
CPC ............... *C04B 11/26* (2013.01); *C04B 11/024* (2013.01); *C04B 28/14* (2013.01); *C04B 2111/0062* (2013.01)
USPC ...................................................... 264/681

(58) Field of Classification Search
USPC ...................................................... 264/681
See application file for complete search history.

(56) References Cited

U.S. PATENT DOCUMENTS

| 2,616,789 | A | * | 11/1952 | Hoggatt ........................ 423/159 |
| 2,907,668 | A | * | 10/1959 | Nies et al. ..................... 423/172 |
| 5,015,449 | A |   | 5/1991  | Koslowski |
| 5,015,450 | A | * | 5/1991  | Koslowski ..................... 423/172 |
| 5,562,892 | A | * | 10/1996 | Kirk et al. ..................... 423/555 |
| 6,652,825 | B2 | * | 11/2003 | Sethuraman et al. ......... 423/555 |
| 7,754,006 | B2 | * | 7/2010  | Liu et al. ....................... 106/778 |
| 2002/0164281 | A1 | * | 11/2002 | Sethuraman et al. ......... 423/555 |
| 2003/0175193 | A1 | * | 9/2003  | Schultz et al. ........... 423/243.08 |
| 2004/0182286 | A1 | * | 9/2004  | Cox et al. ...................... 106/705 |
| 2005/0188898 | A1 | * | 9/2005  | Bruce et al. ................... 106/783 |

FOREIGN PATENT DOCUMENTS

| EP | 0342272 A1 | 11/1989 |
| EP | 0 876 996 A1 | 11/1998 |
| JP | 62-162658 A | 7/1987 |
| JP | 64-065016 A | 3/1989 |
| JP | 03-051665 B2 | 3/1991 |
| JP | 07-144914 A | 6/1995 |
| WO | 89/10905 A1 | 11/1989 |
| WO | 2004/085333 A2 | 10/2004 |

OTHER PUBLICATIONS

The Society of Inorganic Materials, Japan, Cement: Sekko, Sekihai Handbook, first edition, Gihodo Shuppan Co., Ltd., 1995, ISBN 4-7655-0026-8, pp. 424 to 427.
International Search Report: PCT/JP2007/058276.
"Gravity Sedimentation Operation to Heat-Transfer Estimation and Shortcut Methods", Encyclopedia of Chemical Processing and Design: vol. 25: (1987) Marcel Dekker, Inc., New York.

* cited by examiner

*Primary Examiner* — Joseph S Del Sole
*Assistant Examiner* — Russell Kemmerle, III
(74) *Attorney, Agent, or Firm* — Ladas & Parry LLP

(57) ABSTRACT

The present invention provides a method for manufacturing a calcined gypsum wherein the mixing water amount is reduced and the setting time does not increase. As a raw gypsum is compounded with a carboxylic acid-type material and calcined, a calcined gypsum can be manufactured wherein the mixing water amount is small and the setting time does not increase. Furthermore, a regular gypsum board can be manufactured without reducing the productivity of the gypsum board even if a large quantity of recycled gypsum causing increase of the mixing water amount is used as a raw gypsum, because the mixing water amount is small and the setting time does not increase for the calcined gypsum manufactured as described above.

9 Claims, No Drawings

METHODS FOR MANUFACTURING A CALCINED GYPSUM AND A GYPSUM BOARD

TECHNICAL FIELD

The present invention relates to a method for manufacturing a calcined gypsum by calcining a raw gypsum and a method for manufacturing a gypsum board by using the calcined gypsum.

BACKGROUND ART

A calcined gypsum is manufactured by separately calcining or mixing and calcining raw gypsums such as chemical gypsums and natural gypsums so that the raw gypsum which is mainly dihydrate gypsum is principally converted into hemihydrate gypsum.

An appropriate amount of water is added into the calcined gypsum obtained as described above to provide a slurry which is a dihydrate and hardens rapidly and therefore is preferably used for raw materials of various gypsum products, for example, used as a raw material for manufacturing of a gypsum board.

A gypsum board is a board-shaped one in which a core based on dihydrate gypsum is covered with a base paper for gypsum board, wherein, as for manufacturing thereof, a calcined gypsum, a bonding aid, a hardening accelerator, foam for lightening thereof, another additive, and the like, and further an admixture and water are kneaded, and thus obtained calcined gypsum slurry is poured into between upper and lower base papers for gypsum board, shaped into a board-like one, and subsequently cut roughly after hardening thereof, and cut into a product dimension after forced drying thereof.

The gypsum boards manufactured as described above have been widely used as interior materials for building in view of the fire-protection and fire-proof properties, sound-insulating property, workability, economical efficiency thereof and the like. Recently, while the recycle rate of waste gypsum boards at the time of new construction or demolition to gypsum board manufacturers has increased due to the social demand of volume reduction of industrial wastes, the compounding ratio of recycled gypsum in a raw gypsum for gypsum board is increased accordingly. However, with increase of the recycle rate, there are problems of increase of the amount of mixing water for calcined gypsum to provide a calcined gypsum slurry with an appropriate fluidity, mainly caused by a fine gypsum crystal of a recycled gypsum, increase of drying energy required for increasing extra water that has to be dried out in a process for drying a gypsum board, and considerable lowering of the productivity of a gypsum board.

The following prior art is provided for reducing the amount of mixing water for calcined gypsum which is used for manufacturing a gypsum board.

For example, Japanese Examined Patent Application No. H03-51665 discloses a method for manufacturing a calcined gypsum characterized by including a process for conveying raw materials of calcined gypsum to a blender, a process for mixing water into the raw materials of calcined gypsum in the range of about 1% to about 10% by weight of the raw materials and conducting heal treatment of the surfaces of calcined gypsum particles with a small amount of free water for a short time period to prevent the particles from being miniaturized needlessly and dissolved in water, a process for drying the calcined gypsum which has been subjected to the heal treatment at an elevated temperature, and a process for crushing the dried and heal-treated calcined gypsum to increase the surface areas of gypsum particles whereby the surfaces increase the rate of increase of the inner strength of a gypsum board and reacting it with water to increase the final strength thereof whereby the amount of mixing water can be reduced by about 20% compared to a calcined gypsum that is not treated by means of water addition. However, in this method, there is a problem that the rate of manufacturing of a gypsum board is forced to be reduced by increase of the setting time although the mixing water amount of a calcined gypsum can be reduced and a necessary drying energy can be reduced, or a large quantity of a setting accelerator has to be used in order not to reduce the rate of manufacturing of a gypsum board, thereby degrading the various physical properties of the gypsum board. Furthermore, a new water addition treatment apparatus and a dryer for drying out free water remaining in a calcined gypsum after the water addition treatment are needed for this method, and there is a problem that the complexity of equipment or increase of the installation cost thereof is caused thereby increasing the cost for manufacturing a calcined gypsum.

DISCLOSURE OF THE INVENTION

Problems to be Solved by the Invention

The present invention relates to a method for manufacturing a calcined gypsum which is obtained by calcining a raw gypsum and aims to provide a calcined gypsum wherein increase of the mixing water amount is not caused and the setting time does not increase even if a recycled gypsum is used as a raw gypsum.

Another object of the present invention is to provide a method for manufacturing a gypsum board wherein a calcined gypsum obtained by the manufacturing method as described above is utilized.

Means for Solving the Problem

The inventors have actively conducted study, and as a result, have found that a calcined gypsum wherein the mixing water amount is small and the setting time does not increase can be obtained by compounding and calcining a raw gypsum with a carboxylic acid-type material, so as to have led to the present invention.

That is, a method for manufacturing a calcined gypsum according to the invention as recited in claim 1 is characterized in that a raw gypsum is compounded with a carboxylic acid-type material and calcined.

A method for manufacturing a calcined gypsum according to the invention as recited in claim 2 is the method for manufacturing a calcined gypsum according to the invention as recited in claim 1, characterized in that the carboxylic acid-type material to be compounded with a raw gypsum is at least one kind of, succinic acid and salts thereof, malic acid and salts thereof, citric acid and salts thereof, tartaric acid and salts thereof, maleic acid and salts thereof, and gluconic acid and salts thereof.

A method for manufacturing a calcined gypsum according to the invention as recited in claim 3 is the method for manufacturing a calcined gypsum as recited in claim 1 or 2, characterized in that a proportion of the carboxylic acid-type material to be compounded with a raw gypsum is 0.01-10 wt % per a calcined gypsum to be obtained by calcination.

A method for manufacturing a calcined gypsum according to the invention as recited in claim 4 is the method for manufacturing a calcined gypsum as recited in any of claims 1 to 3, characterized in that the raw gypsum comprises a recycled gypsum.

A method for manufacturing a calcined gypsum according to the invention as recited in claim 5 is the method for manufacturing a calcined gypsum as recited in any of claims 1 to 4, characterized in that a proportion of a recycled gypsum is 2-50 wt % of the raw gypsum.

A method for manufacturing a gypsum board according to the invention as recited in claim 6 is characterized in that a calcined gypsum obtained by the method as recited in any of claims 1 to 5 is used.

Advantageous Effect of the Invention

According to the present invention, a calcined gypsum wherein the mixing water amount is small and the setting time does not increase can be manufactured, as a raw gypsum is compounded with a carboxylic acid-type material and calcined. Furthermore, a gypsum board can be manufactured without reducing the productivity in the case where the gypsum board is produced, because the mixing water amount is small and the setting time does not increase for a calcined gypsum manufactured as described above even if a large quantity of recycled gypsum causing increase of a mixing water amount is used as a raw gypsum.

BEST MODE FOR CARRYING OUT THE INVENTION

Some embodiments of the present invention will be described below.

A calcined gypsum according to the present invention is manufactured by compounding a raw gypsum with a carboxylic acid-type material and subsequently making calcination thereof.

The carboxylic acids-type material(s) compounded with a raw gypsum is/are at least one kind of succinic acid and slats thereof, such as succinic acid, sodium succinate, and potassium succinate, malic acid and salts thereof, such as malic acid, sodium malate, and potassium malate, citric acid and salts thereof such as citric acid, sodium citrate, and potassium citrate, tartaric acid and salts thereof, such as tartaric acid, sodium tartrate, and potassium tartrate, maleic acid and salts thereof, and gluconic acid and salts thereof.

The compounding quantity of the carboxylic acid-type material(s) is 0.01-10 wt %, and more preferably 0.02-2 wt %, per the raw gypsum. If the compounding quantity of the carboxylic acid-type material(s) is more than 10 wt %, a large quantity of the carboxylic acid-type material(s) is used thereby causing unfavorable cost increase. If the compounding quantity of the carboxylic acid-type material(s) is less than 0.01 wt %, little effect of reducing the mixing water amount of a calcined gypsum is obtained and unfavorable.

For a raw gypsum in the present invention, a natural gypsum or a chemical gypsum such as a neutralized gypsum or a by-product gypsum can be used solely or a combination of two or more kinds thereof can be used. For representative chemical gypsums, phosphogypsum, fluorogypsum, titanogypsum, desulfogypsum, and the like can be provided, for example.

Furthermore, the raw gypsum according to the present invention can include a recycled gypsum.

The recycled gypsum may be any of recycled gypsums recovered from waste gypsum boards self-produced by a gypsum board manufacturer, waste gypsum boards produced at the time of new construction or demolition, and the like.

The compounding ratio of the recycled gypsum to a normal raw gypsum is in the range of 2-50 wt %, and more preferably, in the range of 10-30 wt %. If the recycle rate is too small, a recycled gypsum to be recovered cannot fully be treated, and if the recycle rate is too large, an obtained calcined gypsum is a fine crystal with a large specific surface area due to a fine gypsum crystal of the recycled gypsum and the amount of mixing water for manufacturing a gypsum board is unfavorably large.

In regard to calcination, a calcined gypsum is obtained by calcining a raw gypsum compounded with a carboxylic acid-type material in an ordinary method using a calcination device such as a kettle or rotary kiln to be used by a person skilled in the art. The calcination device to be used is not particularly limited.

In the present invention, a calcined gypsum obtained after calcination may be further pulverized by using a pulverizing apparatus such as a tube mill.

Thus obtained calcined gypsum is kneaded with a bonding aid, a hardening accelerator, foam for lightening, another additive, and the like and further an admixture and water and thus obtained calcined gypsum slurry (referred to as "slurry" below) is poured into between upper and lower base papers, shaped into a board-like one by passing through between shaping rolls arranged vertically or between upper and lower plates, subsequently hardened on a conveyor belt, cut roughly, and cut into a product dimension after forced drying thereof, so that it can be utilized effectively as a raw material for manufacturing a normal gypsum board to be produced.

EXAMPLES

Next, the present invention is illustrated by some practical examples. However, these practical examples merely illustrate one embodiment of the present invention and the present invention is not limited to these examples at all.

Three kinds of raw gypsums, that is, a mixture of 40 wt % of a natural gypsum and 60 wt % of a desulfogypsum, with 90 wt % of 100 mesh pass, a mixture of 35 wt % of a natural gypsum, 55 wt % of a desulfogypsum, and 10 wt % of a recycled gypsum, with 90% of 100 mesh pass, and a mixture of 25 wt % of a natural gypsum, 45 wt % of a desulfogypsum, and 30 wt % of a recycled gypsum, with 90 wt % of 100 mesh pass, were used.

Practical Example 1

0.50 wt % of succinic acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 2

2.0 wt % of succinic acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 3

8.0 wt % of succinic acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 4

0.50 wt % of sodium succinate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 5

0.50 wt % of potassium succinate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 6

0.50 wt % of malic acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 7

0.50 wt % of sodium malate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 8

0.50 wt % of potassium malate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 9

0.50 wt % of citric acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 10

0.50 wt % of sodium citrate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 11

0.50 wt % of potassium citrate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 12

0.50 wt % of tartaric acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 13

0.50 wt % of sodium tartrate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 14

0.50 wt % of potassium tartrate per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 $cm^2/g$.

Practical Example 15

0.50 wt % of maleic acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 cm²/g.

Practical Example 16

0.50 wt % of gluconic acid per raw gypsum was compounded with 3 kg of the raw gypsum to obtain a mixture. The mixture was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 cm²/g.

Comparison Example 1

3 kg of the raw gypsum was thrown into a small kettle and calcination was conducted to obtain a calcined gypsum while the temperature of a baked product was 165° C. The calcined gypsum stood to cool to room temperature and subsequently was pulverized by using a small pot mill so that the Blaine specific surface area of the calcined gypsum was adjusted to about 8000 cm²/g.

Comparison Example 2

Heal Treatment 3 kg of the raw gypsum was thrown into a small kettle and primary calcination was conducted to obtain a calcined gypsum while the temperature of a baked product was 165° C. After the calcined gypsum stood to cool to room temperature, 300 g thereof was put into a plastic bag, closed after 9 g of water was added by means of spraying, immediately and violently agitated for 1 minute, subsequently put into a drying machine, and left for 24 hours at a setting temperature of 40° C. so as to evaporate free water remaining in the calcined gypsum. The obtained calcined gypsum was pulverized by using a small pot mill so that the Blaine specific surface area of the calcined gypsum was adjusted to about 8000 cm²/g.

The samples of calcined gypsum obtained in practical examples 1-16 and comparison examples 1-2 were used to perform tests of their physical properties, that is, the mixing water amount and setting time thereof.

The test methods of the mixing water amount and setting time of a calcined gypsum were in accordance with JIS R 9112. Each of the test results and raw material formulations is shown in Table 1.

While the mixing water amount of the calcined gypsum obtained in any of practical examples 1-16 and comparison examples 1-2 increased with increasing the compounding ratio of the recycled gypsum to the raw gypsum, there was found no change in the setting time with respect to the difference between the compounding ratios of the recycled gypsum.

The mixing water amount of the calcined gypsum obtained in practical example 1 was 10% less than that of the calcined gypsum obtained in comparison example 1 and its setting time was less than that of the calcined gypsum obtained in comparison example 2.

The mixing water amount of the calcined gypsum obtained in practical example 2 was further 10% less than that of the calcined gypsum obtained in practical example 1 and showed a comparable setting time. Accordingly, it was confirmed that the effect of educing the mixing water amount was improved by increasing the loading of succinic acid from 0.5 wt % to 2.0 wt %.

It was shown that the mixing water amount of the calcined gypsum obtained in practical example 3 was comparable to that of the calcined gypsum obtained in practical example 2. Accordingly, it was confirmed that the effect of further reducing the mixing water amount was not sufficiently exerted by increasing the compounding ratio of succinic acid from 2.0 wt % to 8.0 wt %.

It was shown that the mixing water amount and setting time of the calcined gypsum obtained in any of practical examples 4-16 were comparable to those of the clacined gypsum obtained in practical example 1.

As described above, it was confirmed that a raw gypsum was compounded with a carboxylic acid-type material and calcined according to the present invention so that a calcined gypsum wherein the mixing water amount is small and the setting time is short can be manufactured.

TABLE 1

| | Raw material formulation (wt %) | | | Carboxylic acid-type material | | Mixing water amount | Setting time (minutes-seconds) | | |
|---|---|---|---|---|---|---|---|---|---|
| | Natural | Flue-gas desulfurization | Waste gypsum | Material name | Wt % | (%) | Start | Apparent | End |
| Practical example 1 | 40 | 60 | 0 | Succinic acid | 0.5 | 70 | 11-25 | 14-05 | 24-00 |
| | 35 | 55 | 10 | | 0.5 | 75 | 11-20 | 14-15 | 24-20 |
| | 25 | 45 | 30 | | 0.5 | 85 | 11-20 | 14-10 | 24-20 |
| Practical example 2 | 40 | 60 | 0 | Succinic acid | 2.0 | 62 | 11-20 | 14-00 | 24-00 |
| | 35 | 55 | 10 | | 2.0 | 67 | 11-25 | 14-10 | 24-30 |
| | 25 | 45 | 30 | | 2.0 | 78 | 11-30 | 14-00 | 24-00 |
| Practical example 3 | 40 | 60 | 0 | Succinic acid | 8.0 | 61 | 11-45 | 14-30 | 24-30 |
| | 35 | 55 | 10 | | 8.0 | 66 | 11-40 | 14-30 | 24-40 |
| | 25 | 45 | 30 | | 8.0 | 76 | 11-40 | 14-50 | 24-50 |
| Practical example 4 | 40 | 60 | 0 | Sodium succinate | 0.5 | 71 | 11-25 | 14-05 | 24-00 |
| | 35 | 55 | 10 | | 0.5 | 76 | 11-20 | 14-15 | 24-20 |
| | 25 | 45 | 30 | | 0.5 | 85 | 11-20 | 14-10 | 24-20 |
| Practical example 5 | 40 | 60 | 0 | Potassium succinate | 0.5 | 72 | 11-25 | 14-05 | 24-00 |
| | 35 | 55 | 10 | | 0.5 | 77 | 11-25 | 13-55 | 24-00 |
| | 25 | 45 | 30 | | 0.5 | 87 | 11-20 | 14-35 | 24-20 |

TABLE 1-continued

| | Raw material formulation (wt %) | | | Carboxylic acid-type material | | Mixing water amount (%) | Setting time (minutes-seconds) | | |
|---|---|---|---|---|---|---|---|---|---|
| | Natural | Flue-gas desulfurization | Waste gypsum | Material name | Wt % | | Start | Apparent | End |
| Practical example 6 | 40 | 60 | 0 | Malic acid | 0.5 | 72 | 11-20 | 14-10 | 24-05 |
| | 35 | 55 | 10 | | 0.5 | 77 | 11-25 | 14-10 | 24-30 |
| | 25 | 45 | 30 | | 0.5 | 87 | 11-20 | 14-10 | 24-00 |
| Practical example 7 | 40 | 60 | 0 | Sodium malate | 0.5 | 72 | 11-25 | 13-55 | 23-50 |
| | 35 | 55 | 10 | | 0.5 | 77 | 11-20 | 14-15 | 24-20 |
| | 25 | 45 | 30 | | 0.5 | 87 | 11-20 | 14-25 | 24-40 |
| Practical example 8 | 40 | 60 | 0 | Potassium malate | 0.5 | 71 | 11-45 | 14-30 | 24-20 |
| | 35 | 55 | 10 | | 0.5 | 76 | 11-50 | 14-35 | 24-40 |
| | 25 | 45 | 30 | | 0.5 | 85 | 11-50 | 14-50 | 24-50 |
| Practical example 9 | 40 | 60 | 0 | Citric acid | 0.5 | 72 | 11-20 | 14-00 | 24-00 |
| | 35 | 55 | 10 | | 0.5 | 78 | 11-25 | 14-10 | 24-30 |
| | 25 | 45 | 30 | | 0.5 | 86 | 11-20 | 14-10 | 24-30 |
| Practical example 10 | 40 | 60 | 0 | Sodium citrate | 0.5 | 73 | 11-55 | 14-50 | 24-50 |
| | 35 | 55 | 10 | | 0.5 | 79 | 12-10 | 14-45 | 25-00 |
| | 25 | 45 | 30 | | 0.5 | 87 | 12-20 | 14-50 | 25-20 |
| Practical example 11 | 40 | 60 | 0 | Potassium citrate | 0.5 | 72 | 11-25 | 14-05 | 24-50 |
| | 35 | 55 | 10 | | 0.5 | 78 | 11-20 | 14-15 | 24-20 |
| | 25 | 45 | 30 | | 0.5 | 87 | 11-25 | 14-10 | 24-20 |
| Practical example 12 | 40 | 60 | 0 | Tartaric acid | 0.5 | 73 | 11-55 | 14-50 | 24-50 |
| | 35 | 55 | 10 | | 0.5 | 79 | 12-10 | 14-55 | 25-00 |
| | 25 | 45 | 30 | | 0.5 | 86 | 12-20 | 15-10 | 25-20 |
| Practical example 13 | 40 | 60 | 0 | Sodium tartrate | 0.5 | 73 | 11-20 | 14-00 | 24-00 |
| | 35 | 55 | 10 | | 0.5 | 79 | 11-25 | 14-10 | 24-30 |
| | 25 | 45 | 30 | | 0.5 | 87 | 11-20 | 14-00 | 24-00 |
| Practical example 14 | 40 | 60 | 0 | Potassium tartrate | 0.5 | 73 | 11-30 | 14-00 | 24-00 |
| | 35 | 55 | 10 | | 0.5 | 78 | 12-25 | 14-10 | 24-30 |
| | 25 | 45 | 30 | | 0.5 | 86 | 12-30 | 14-20 | 24-20 |
| Practical example 15 | 40 | 60 | 0 | Maleic acid | 0.5 | 72 | 11-35 | 14-10 | 24-10 |
| | 35 | 55 | 10 | | 0.5 | 77 | 11-30 | 14-15 | 24-30 |
| | 25 | 45 | 30 | | 0.5 | 87 | 11-40 | 14-20 | 24-10 |
| Practical example 16 | 40 | 60 | 0 | Gluconic acid | 0.5 | 70 | 11-25 | 14-05 | 24-00 |
| | 35 | 55 | 10 | | 0.5 | 75 | 11-20 | 14-15 | 24-20 |
| | 25 | 45 | 30 | | 0.5 | 85 | 11-20 | 14-10 | 24-20 |
| Comparative example 1 | 40 | 60 | 0 | — | — | 78 | 11-20 | 14-00 | 24-00 |
| | 35 | 55 | 10 | | — | 83 | 11-25 | 14-10 | 24-30 |
| | 25 | 45 | 30 | | — | 95 | 11-20 | 14-00 | 24-00 |
| Comparative example 2 | 40 | 60 | 0 | — | — | 64 | 15-10 | 19-00 | 35-00 |
| | 35 | 55 | 10 | | — | 67 | 15-20 | 19-20 | 35-20 |
| | 25 | 45 | 30 | | — | 76 | 15-20 | 19-20 | 35-10 |

[Others]

Additionally, the present application claims the priority based on Japanese Parent Application No. 2006-179984 filed on Jun. 29, 2006, the contents of which Japanese Application are incorporated by reference for the present application.

The invention claimed is:

1. A method for manufacturing a baked gypsum product, consisting of:
   a step of compounding a raw gypsum with a carboxylic acid-type material to obtain a mixture of the raw gypsum and the carboxylic acid-type material, a ratio of the carboxylic acid-type material to the raw gypsum being within a range of 0.01 wt % to 10 wt % per the raw gypsum, the raw gypsum being in 90 wt % of 100 mesh pass;
   a step of baking the mixture by using a kettle or a rotary kiln to obtain a baked gypsum;
   a step of cooling the baked gypsum to obtain a cooled gypsum; and
   a step of pulverizing the cooled gypsum to obtain a baked gypsum product, an amount of water to be mixed into the baked gypsum product being within a range of 61 wt % to 87 wt %,
   wherein the carboxylic acid-type material includes at least one selected from the group consisting of malic acid and salts thereof, citric acid and salts thereof, tartaric acid and salts thereof, maleic acid and salts thereof, and gluconic acid and salts thereof.

2. The method for manufacturing a baked gypsum product as claimed in claim 1, the ratio of the carboxylic acid-type material to the raw gypsum is within a range of 2.0 wt % to 10 wt % per the raw gypsum.

3. The method for manufacturing a baked gypsum product as claimed in claim 1, wherein the raw gypsum includes a recycled gypsum.

4. The method for manufacturing a baked gypsum product as claimed in claim 3, wherein a content of the recycled gypsum in the raw gypsum is 2 wt % to 50 wt %.

5. The method of manufacturing a baked gypsum product as claimed in claim 1, wherein the carboxylic acid-type material includes at least one selected from the group consisting of malic acid and salts thereof.

6. The method of manufacturing a baked gypsum product as claimed in claim 1, wherein the carboxylic acid-type material includes at least one selected from the group consisting of citric acid and salts thereof.

7. The method of manufacturing a baked gypsum product as claimed in claim 1, wherein the carboxylic acid-type material includes at least one selected from the group consisting of tartaric acid and salts thereof.

8. The method of manufacturing a baked gypsum product as claimed in claim 1, wherein the carboxylic acid-type material includes at least one selected from the group consisting of maleic acid and salts thereof.

9. The method of manufacturing a baked gypsum product as claimed in claim 1, wherein the carboxylic acid-type material includes at least one selected from the group consisting of gluconic acid and salts thereof.

* * * * *